May 24, 1938.  E. J. DILLMAN  2,118,759
HEATING SYSTEM AND CONTROL MEANS THEREFOR
Filed March 9, 1934   2 Sheets-Sheet 1
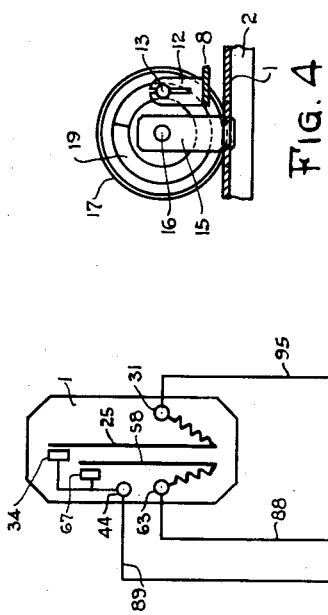
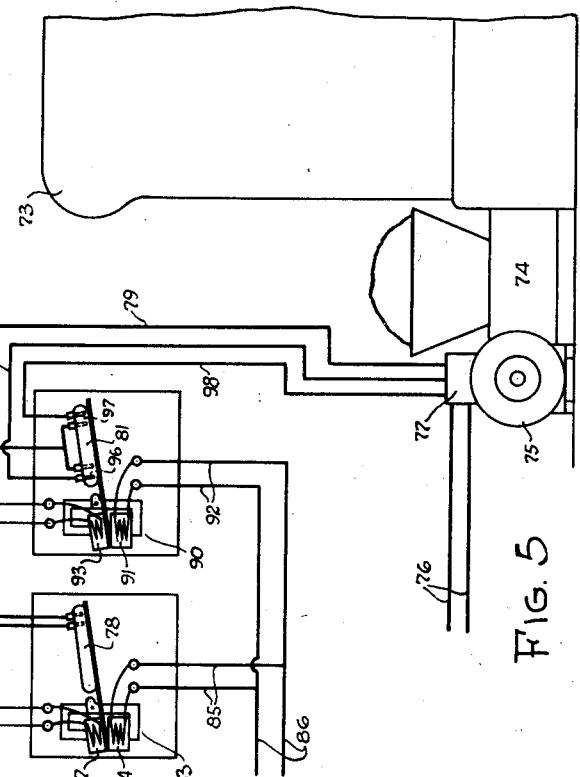
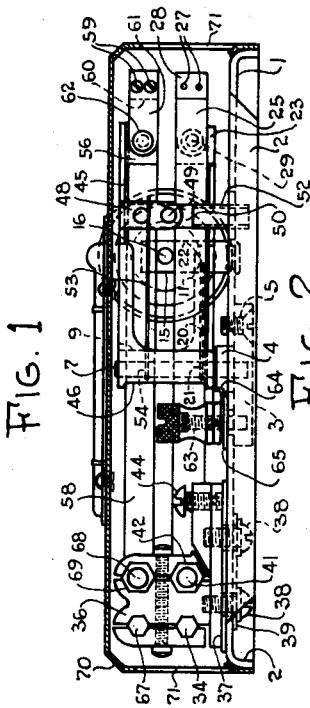
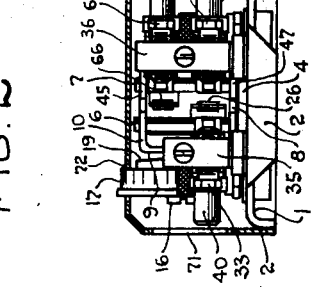
INVENTOR
Earnest J. Dillman
BY
his ATTORNEY May 24, 1938.  E. J. DILLMAN  2,118,759
HEATING SYSTEM AND CONTROL MEANS THEREFOR
Filed March 9, 1934  2 Sheets-Sheet 2

INVENTOR
Earnest J. Dillman
BY
his ATTORNEY

Patented May 24, 1938

2,118,759

UNITED STATES PATENT OFFICE 2,118,759

HEATING SYSTEM AND CONTROL MEANS THEREFOR

Earnest J. Dillman, Detroit, Mich., assignor to Detroit Lubricator Company, Detroit, Mich., a corporation of Michigan Application March 9, 1934, Serial No. 714,744

13 Claims. (Cl. 200—139)

My invention relates to a heating system having a thermostat for controlling the operation of the system in response to the requirements of a room or other space to be heated.

An object of my invention is to provide a novel system in which the rate of heat supplied to the room or space will vary in accordance with the temperature of the room or space.

Another object is to provide a thermostat which is particularly adapted for variably controlling the heating system.

Another object is to provide a thermostat which is of simple construction and which may be readily adjusted for response to different degrees of temperature.

Another object is to provide a thermostat having two switch means operable at a predetermined differential and in which the differential between operation of the switch means will be maintained upon adjustment of the thermostat.

The invention consists in the novel thermostat and the particular system embodying the same, to be more fully described hereinafter and the novelty of which will be particularly pointed out and distinctly claimed.

In the accompanying drawings, to be taken as a part of this specification, I have fully and clearly illustrated a preferred embodiment of the thermostat and certain heating systems employing the thermostat, in which drawings—

Figure 1 is a plan view of the thermostat, having its cover or closure member removed;

Fig. 2 is a view thereof in side elevation, showing the cover member in place and in vertical section;

Fig. 3 is a view in end elevation, looking from left to right of Fig. 1 and also showing the cover member in section;

Fig. 4 is a detail view of certain adjusting means;

Fig. 5 is a diagrammatic view of an automatically fired heating system embodying the thermostat of Figs. 1, 2 and 3;

Figure 7:
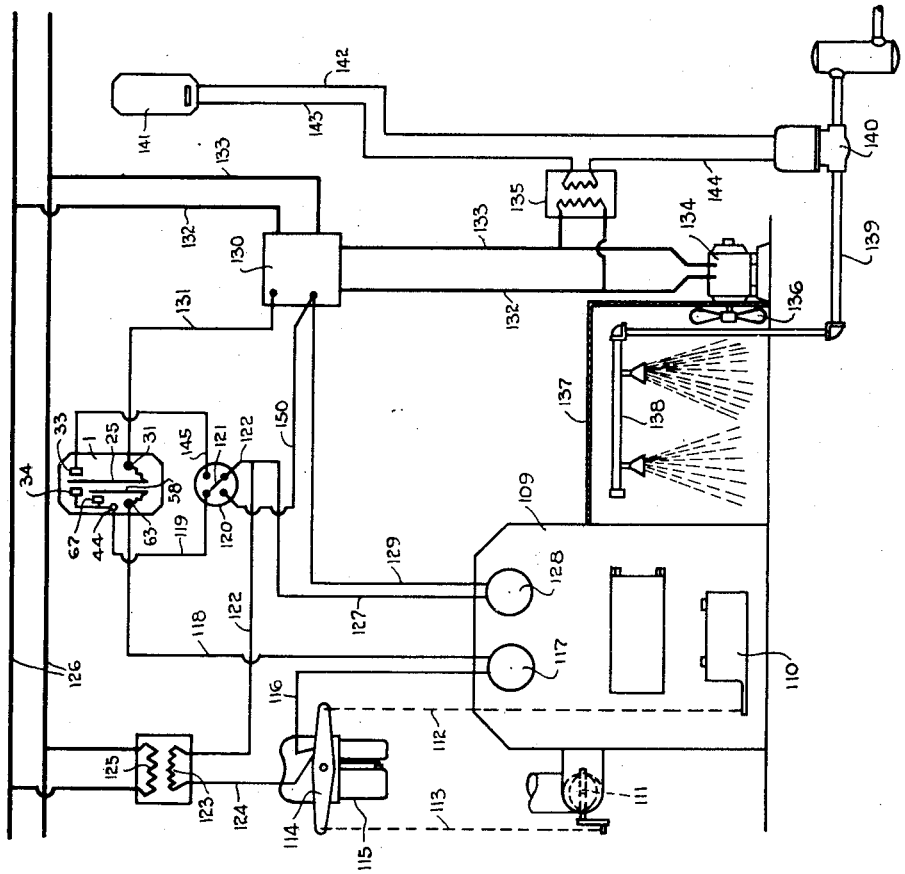
Fig. 7 is a diagrammatic view of another heating system embodying my novel thermostat.

Referring to the drawings by characters of reference, I designates generally a base member or supporting plate of metal and of elongated rectangular form, having downwardly or rearwardly extending flanged portions 2 at its side and end edges for engagement with a wall or other surface to which the thermostat is to be secured. Secured to the underface of the base member I substantially at its mid-portion, there is a supporting block 3 of electric insulating material having a projecting portion 4 extending from its top face through an aperture in the base member I. A screw 5 serves to tightly clamp the block 3 to the member I. Secured in the block 3 and portion 4 there are a pair of laterally spaced bearing posts 6, 7 which project vertically and in parallel relation to each other from the top face of the portion 4. The post 6 has an adjustment lever 8 pivoted thereon at one end, the lever being apertured at this end to receive the post 6 and seating on the portion 4. This pivoted end of the lever 8 is provided with an upstanding flange 9 parallel and adjacent to the post 6. At its upper end the flange 9 has an ear 10 which is apertured to pivotally receive the upper end of the post 6 so that the lever is rigidly supported and held against rocking movement in planes through the longitudinal axis of the post. The lever 8 is provided with a reenforcing and spring abutment flange 11 extending upwardly along the outer side edge of the lever and joining with the flange 9. The flange 11 terminates substantially midway of the length of the lever 8 and beyond the end of the flange 11 there is an upwardly extending supporting ear 12 carrying a cam follower member 13 which projects horizontally from the outer side edge of the lever 8. The ear 12 is preferably carried on the outer end of an extension 14 projecting from the outer side edge of the lever 8. Rigidly mounted on the base member I intermediate the extension 14 and the post 6, there is a supporting post 15. Pivotally supported on a shaft 16 secured at one end in the post 15 and projecting horizontally outward therefrom transverse to lever 8, there is a cam wheel 17 having a circular cam 18 of less diameter than the wheel 17 projecting from the inside face of the wheel toward the lever 8 and having a spiral cam face 19 cooperable with and engaging the cam follower 13. The lever 8 is held in adjusted position with the follower 13 engaging the face 19 by a leaf spring 20, preferably a piece of spring wire having one end 21 fixed to the post 6 and extending into an aperture diametrically therethrough and having its other end 22 engaging the inside face of the flange 11. The free end of the lever 8 is provided on its inner end with an upstanding flange 23 having an inwardly offset portion 24 which extends longitudinally beyond the end of the lever 8. Secured to the inside face of the offset portion 24, there is one end of a thermostatic blade or element 25 which extends longitudinally of the lever 8 and terminates adjacent the opposite end of the base member 1, being provided at its free terminal end portion with oppositely facing electric contacts 26. The blade 25 is secured to the portion 24 by screws 27 which pass through the blade and are threaded into a plate 28 which clamps the blade against the portion 24. The screws 27 also secure a resilient leaf or plate 28 to the outer face of the flange portion 24, the plate engaging at its free end under the head of an adjustment screw 29 which is screw-threaded through the flange 23 so as to hold the screw in adjusted position. The screws 27 and plate 28 tension the blade 25 against the inner end of the screw 29 so that the screw 29 is operable to adjust the position of the blade 25 relative to the lever 8. The lever 8 is electrically connected by a jumper strip 30 to a binding post 31. The strip 30 is apertured at one end to receive the post 6 and is positioned at this end between the lever 8 and the block portion 4. The other end of the strip 30 is insulated from the base member 1 by a pad 32 of electric insulating material and is apertured to receive the binding post 31 which extends through an opening in the base member 1 and is supported in the block 3. The free end portion of the blade 25 is positioned between oppositely positioned contact members 33, 34, preferably in the form of screws adjustably threaded for longitudinal movement in parallel supporting blocks or members 35, 36 which are secured in parallel spaced relation to the base member 1. The supporting blocks 35, 36 are each electrically insulated from the base member 1 by interposed plates or pads 37 of electric insulating material. The blocks 35, 36 are secured to the base member 1 by screws 38 which pass through openings in the base member 1 and are threaded into the supporting blocks 35, 36, an insulating member 39 being positioned between the heads of the screws and the underside of the base member 1. The free end portion of the blade 25 provides an armature cooperable with oppositely disposed magnets 40, 41 which are preferably of the permanent bar type supported in sleeve members 42 adjustably screw-threaded in the supporting blocks 35, 36. The position of the magnet 40 relative to the blade 25 when the contact 26 is in engagement with contact 33 and of the magnet 41 with respect to the blade 25 when the contact 26 is in engagement with the contact 34 determines the differential operation of the blade 25. Adjustment of the magnets to increase the air gap when contact is made between the blade and the contact adjacent the magnet decreases the differential operation. The supporting blocks 35, 36 are provided with binding screws 43, 44 respectively for electrically connecting the contact members 33, 34 in circuit.

The post 7 has an adjustment lever 45 pivoted thereon, the lever being apertured adjacent one end to receive the post. The lever 45 is spaced vertically from the lever 8 and lies in a plane substantially parallel thereto. The lever 45 is supported in this position by a flange 46 extending from the outer side edge of the lever at its pivoted end and terminating at the block portion 4 where it is provided with an ear 47 apertured to receive the post 7 and resting on the block portion 4. The lever 45 is thus held against movement in planes through the longitudinal axis of the post 7 while being free to turn thereon. Intermediate the ends of the lever 45 there is a flange 48 which extends downward from the outer side edge of the lever at a point substantially opposite the follower member 13. Secured to the flange 48 by rivets or the like 49 there is a finger or abutment pin 50 which extends through an enlarged opening 51 in the base member, the opening being of sufficient size to permit unlimited movement of the finger within the range of operation of the lever 45. The finger 50 engages the inner side edge of the lever 8 and is provided with a sleeve of electric insulating material 52 to insulate the levers from each other. The finger 50 is resiliently urged into engagement with the edge of lever 8 by a leaf spring 53, preferably a piece of spring wire which is secured to the post 7 by fixing one end 54 thereof in an aperture through the post. The other end 55 of spring 53 bears against the outside face of the flange 48. The free end of lever 45 is provided with a downward extending flange 56 which projects longitudinally beyond the end of the lever and has an inwardly offset portion 57. A thermostatic blade 58 of bimetal is secured at one end to the flange portion 57, preferably by screws 59 which pass through the blade 58 and are threaded into a clamping plate 60 which clamps the blade to the portion 57. The screws 59 also serve to secure a resilient leaf member 61 to the outside face of the portion 57, the free end of the member 61 lying against the underside of the head of an adjustment screw 62 threaded in the flange 56. The blade 58 is urged by the plate 60 against the end of the screw 62 so that adjustment of the screw will regulate the position of the blade 58 relative to the lever 45. It will also be noted that the screws 29 and 62 are operable to adjust the blades 25 and 58 relative to each other. The member 61 acts by its resilient force against the head of screw 62 to hold the same in adjusted position. The lever 45 is electrically connected to a binding post 63 by a jumper strip 64 apertured at one end to receive the post 7 and lying at this end between the ear 47 and the block portion 4. The other end of the strip 64 is apertured to receive the binding post 63 and is insulated from the base member 1 by a pad 65 of electric insulating material. The post 63 extends through an aperture in the base member 1 and is supported in the insulating block 3. The blade 58 extends longitudinally of the base member 1 and in overlying relation to the blade 25. The free end portion of the blade 58 is provided with an electric contact 66 which cooperates with a contact member 67 preferably in the form of a screw adjustably threaded in the supporting block 36 in vertical spaced relation to the contact screw 34. The free end portion of the blade 58 comprises an armature cooperable with a magnet 68 preferably of the permanent bar type which is supported in a sleeve member 69 adjustably screw-threaded in the supporting block 36 in vertically spaced overlying relation to the magnet 41. The magnet 68 cooperates with the armature portion of the blade 58 to determine the differential operation of the blade and by adjustment is operable to regulate the differential. The mechanism described is preferably housed within a box-like cover member 70 which has its side and end walls frictionally engaging the flanges 2 to hold the cover member in place. The cover member is preferably provided with a plurality of apertures 71 in its side and end walls to permit free circulation or flow of air through the casing and in contact with the blades 25 and 58. The top wall of the cover member 70 is provided with a longitudinal slot 72 through which a portion of the cam wheel 17 projects so that it may be manually operated by the thumb or finger of an operator. The wheel is preferably provided on its circumference with suitable indicia to indicate the position to which it has been adjusted.

In the operation of the thermostat, the blade 58 is adjusted relative to the blade 25 by means of the screws 62 and 29 respectively so that there will be a given predetermined differential between the degrees of temperature at which the blades will make contact with their contact members 67 and 34 respectively. The adjustment is preferably such that blade 25 will engage its contact member 34 upon a predetermined decrease of temperature after the blade 58 has engaged its contact member 67. This predetermined differential will be maintained irrespective of the adjustment of the blade 25 by the wheel 17. When the wheel 17 is rotated to increase the temperature at which the blade 25 makes contact, the cam face 19 will act on the follower 13 to move the lever 8 against the force of spring 20 thereby moving the blade 25 relative to its contact member 34 since the blade is carried by the lever 8. As the lever 8 is moved, it will act through its engagement with the finger 50 to rotate the lever 45 on its bearing post 7 against the force of its spring 53 and will therefore adjust the position of the blade 58 relative to its contact member 67. Since the blades 25 and 58 move in unison in response to adjustment of the wheel 17, the differential between operation of the blades to make contact will be maintained irrespective of the adjustment of the lever 8 by the wheel 17.

In Fig. 5, I have shown an automatically controlled heating system comprising a boiler or furnace 73 for supplying a heating medium to a space or room to be heated. The heating apparatus 73 is provided with a stoker 74 including an operating motor 75 supplied with current from lead wires 76 which connect to automatic means 77 such as a voltage regulator or the like for controlling the speed of the stoker motor. In circuit with the control means 77 there is a switch 78 which is operable to complete a circuit to the control means 77 via lead wire 79 and lead wire 80 connected to a double pole, double throw switch 81. From the switch 81 a lead wire 82 connects to the control means 77 so that when the switch 78 is closed the circuit to the control means will be completed through the switch 81. The switch 78 is operated by a relay mechanism 83 including a transformer, the primary 84 of which is connected by lead wires 85 to a main current supply line 86. The secondary 87 of the transformer is connected to my thermostat above described by a lead wire 88 connected to the terminal post 63 and by a lead wire 89 connected to the terminal screw 44 which transmits current through the block 36 to the contact members 67 and 34. The switch 81 is controlled by a relay mechanism 90 including a transformer having its primary 91 connected by lead wires 92 to the line 86. The secondary 93 of this transformer is connected by a lead wire 94 to the lead wire 89 and by a lead wire 95 to the terminal post 31 of the thermostat. When the relay mechanism 90 is deenergized, circuit is completed through the contacts 96 of the switch 81 so that the switch 78 in circuit with these contacts 96 may energize the control means 77. The contacts 97 of the switch 81 are connected to the lead wire 80 and to a lead wire 98 so that when the mechanism 90 is energized a circuit will be completed through the control means 77 via lead wire 79, switch 78 if closed, lead wire 80, contacts 97 and lead wire 98. When the temperature of the air in the room or space to be heated drops below the desired degree which is to be maintained, then the blade 58 will make contact with its contact member 67 and complete a circuit through the transformer secondary 87 via lead wires 89 and 88 thereby energizing the relay mechanism 83 to actuate the switch 78 to make circuit between the lead wires 79 and 80. With the circuit completed between the lead wires 79 and 80, the control means 77 will be energized to start the stoker motor 75 via the following circuit: lead wire 79, switch 78, lead wire 80, switch contacts 96 and lead wire 82. If the operation of the stoker does not supply sufficient heat to the room or space containing the thermostat so that the temperature therein continues to decrease, then the blade 25 will make contact with its contact member 34 and complete a circuit through the transformer secondary 93 of the relay mechanism 90 via the lead wires 89, 94 and 95. The energization of the relay mechanism 90 will actuate the switch means 81 to break circuit at contacts 96 and close circuit at contacts 97 between lead wires 80 and 98. With the circuit closed at contacts 97, the control means 77 will be energized to increase the speed of the stoker motor 75 thereby increasing the rate of heat supply to the room or space to be heated, this circuit to the control means 77 being via lead wire 79, closed switch 78, lead wire 80, contacts 97 and lead wire 98. As soon as the temperature to which the thermostat is subjected has risen sufficiently to satisfy the blade 25, it will break contact with its contact member 34 thereby deenergizing the relay mechanism 90 to move the switch 81 to break contact at contacts 97 and to again complete the circuit through contacts 96 so that the speed of the stoker motor 75 will be decreased thereby decreasing the rate at which heat is supplied to the room or space. When the blade 58 has become satisfied, it will break circuit at contact member 67 thereby deenergizing the relay mechanism 83 to open the switch 78 and thereby actuating the control means 77 to stop the stoker motor 75.

Figure 6:
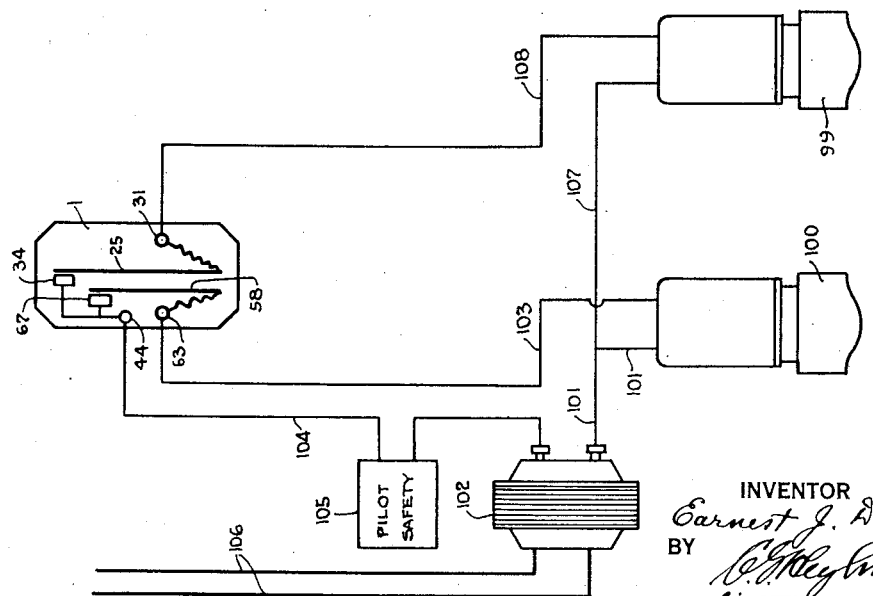
Fig. 6 is a diagrammatic view showing the thermostat in circuit with automatic control valves for a fluid fuel heating system.

In Figure 6, the thermostat is shown as controlling the operation of fluid fuel supply valves 99 and 100 which are operable respectively to provide a maximum fuel flow and a lesser fuel flow. These valves are electrically operated and are preferably of any of the well-known types of solenoid valves. The valve 100 has its solenoid connected by a lead wire 101 to one terminal of the secondary of a transformer 102 and is connected by a lead wire 103 to the terminal post 63 of the thermostat. From the other terminal of the transformer secondary a lead wire 104 connects to the terminal post 44 of the thermostat, a pilot safety means 105 preferably being inserted in the lead wire 104 to control the operation of the valves 99 and 100. The primary of the transformer 102 is connected to a main current supply line 106. The solenoid of the valve 99 is connected by a lead wire 107 to the lead wire 101 and is connected by a lead wire 108 to the terminal post 31 of the thermostat. When the temperature at the thermostat and to which the blade 58 is subjected drops below the predetermined desired degree, the blade 58 will make contact with its contact member 67 thereby completing a circuit via lead wire 104 to the transformer secondary, and thence via lead wire 101 to the solenoid of valve 100 and from the solenoid via lead wire 103 to the blade 58. This circuit will energize the valve 100 causing it to open and supply fuel to a burner, but the quantity of fuel supplied by the valve 100 will be less than that necessary to provide a maximum flame. If the temperature of the air surrounding the thermostat continues to decrease in the face of the heat supplied by the fuel fed through valve 100, then the blade 25 will engage its contact member 34 and open the maximum fuel flow valve 99, this circuit being from contact member 34 through lead wire 104 to the transformer secondary and thence through lead wires 101 and 107 to the solenoid of valve 99 and from the solenoid via lead wire 108 to the terminal post 31 and the blade 25. As the temperature surrounding the thermostat increases, the blade 25 will break circuit with its contact member 34 thereby deenergizing the solenoid of valve 99 and permitting the valve to close. When the temperature has increased to the predetermined desired degree, the blade 58 will break circuit at its contact member 67 thereby deenergizing the solenoid of valve 100 and permitting the valve to close thereby stopping further supply of heat to the room or space containing the thermostat.

In Fig. 7, I have shown another heating system and my thermostat for controlling the same. In this system, there is a furnace 109 for supplying heated air to the room or space containing the thermostat, the furnace combustion chamber having an air inlet draft damper 110 and a check damper 111 in the combustion chamber outlet pipe or smoke flue. These dampers are connected by chains 112, 113 respectively to the opposite ends of a lever arm 114 of an electrically operated damper regulator 115 which is preferably of any of the heat motor types now on the market. The regulator is connected in series circuit by a lead wire 116 to a thermostatic safety switch 117 responsive to bonnet air temperature of the furnace 109 to break the circuit of the regulator upon the occurrence of a maximum safe temperature in the furnace bonnet. From the switch 117 a lead wire 118 connects to the terminal post 63 of the thermostat. From the terminal post 44 of the thermostat a lead wire 119 connects to a manually operated double throw switch 120 having a blade 121 operable to connect the lead wire 119 to a lead wire 122 which is connected to one terminal of the transformer secondary 123. From the other terminal of the transformer secondary a lead wire 124 connects to the regulator 115. The primary 125 of the transformer is connected by suitable lead wires to a main current supply line 126. From the lead wire 122 lead wire 127 connects to one terminal of a thermostatic switch 128 responsive to bonnet air temperature in the furnace 109, the switch being operable to maintain its circuit open for all bonnet air temperatures below a predetermined minimum degree and to close its circuit when the minimum temperature has been reached in the bonnet. From the switch 128 a lead wire 129 connects to the control mechanism of an automatically operated main switch 130 and from the control mechanism a lead wire 131 connects to the thermostat binding post 31 of blade 25. The automatic switch 130 acts when energized to close a circuit from the main line 126 through lead wires 132, 133, a fan motor 134 and to the primary of a transformer 135 in parallel circuit with the motor 134. The automatic switch 130 includes a relay transformer having its primary connected across the lead wires 132, 133 and having its secondary in the circuit of lead wires 129, 131. The motor 134 drives a fan 136 for forcing air through the casing 137 of a humidifier means forming the inlet of the casing 137 which is connected to the inlet of the furnace jacket. Within the casing 137 there is a spray humidifier 138 supplied with water through a pipe 139 controlled by an electrically operated valve 140. A hygrostat 141 responsive to the moisture content of the air in the room or space to be heated and having switch means operable thereby controls the operation of the water valve 140. The lead wires 142, 143 from the hygrostat switch connect respectively to the operating means of the valve 140 and to one terminal of the secondary of the transformer 135. From the other terminal of the transformer secondary a lead wire 144 connects to the operating means of the valve 140 so that the valve operating means, the transformer secondary and the hygrostat switch are in series circuit. The manually operable switch blade 121 may be moved to make circuit between the switch terminals of lead wires 145, 150, the movement of the blade breaking contact between lead wires 119 and 122. The lead wire 145 connects to the binding post of thermostat contact member 33. The lead wire 150 connects in common with the lead wire 129 to the secondary of the relay transformer control means of the automatic switch 130.

The operation of this system shown in Fig. 7 is as follows: During the heating season, the switch blade 121 will be in the position shown, completing circuit between the lead wires 119 and 122. When the temperature at the thermostat drops so that the blade 58 becomes unsatisfied and engages its contact member 67, a circuit will be completed through the lead wire 119, blade 121, lead wire 122, transformer secondary 123 and lead wire 124 to the damper regulator 115 and from the damper regulator through lead wire 116, safety switch 117 and lead wire 118 to the blade 58. This circuit, assuming the switch 117 to be closed, will energize the regulator 115 to open the inlet draft damper 110 and close the air admitting check damper 111 thereby increasing the rate of combustion and the temperature of the air in the bonnet of furnace 109. If the temperature of the air surrounding the thermostat decreases further so that the blade 25 becomes unsatisfied and makes contact with its contact member 34, a circuit will be established through lead wire 119, switch blade 121, lead wires 122, 127 to the minimum temperature bonnet switch 128 and thence via lead wire 129 to and through the transformer secondary of the relay control means of automatic switch 130 and thence through lead wire 131 to the thermostat blade 25. If the bonnet temperature has reached the minimum degree at which it is desirable to increase the flow of the air to be heated by the furnace and supplied to the room containing the thermostat, then the switch 128 will be closed thereby completing the circuit of blade 25. With the circuit of blade 25 completed, the main switch 130 will be closed thereby completing the circuit through lead wires 132, 133 to the fan motor 134 and to the transformer 135. The fan 136 will now be operated to increase the air flow through the furnace bonnet and when the increased rate of heated air discharged into the room has satisfied the blade 25 so that it breaks circuit with its contact member 34, then the control means of switch 130 will be deenergized and the fan will be stopped. When the fan is in operation, the hygrostat 141 is in control of the water valve 140 and if the moisture content of the air in the space to be heated is below the desired point, the circuit of valve 140 will be completed at the hygrostat, thus opening the water valve and supplying water to the sprays of the humidifier means 138. The humidified air discharge through the furnace bonnet by the fan 136 will increase the humidity in the heated space and when the humidity has reached the desired point, the hygrostat 141 will close the water valve 140 thereby stopping the further addition of moisture to the room air. Should the furnace overheat before the blade 58 became satisfied, then the switch 117 would act to break the circuit of the regulator 115 and cause closing of the inlet damper 110 and opening of the air inlet check damper 111. This operation resulting from opening of the switch 117, however, will not stop the operation of the fan 136 as the circuit of the control means of switch 130 does not include the switch 117. As the temperature in the room containing the thermostat increases, the blade 25 will break contact with its contact member 34 and stop the fan 136 and also further humidification of the air supplied to the room and when the thermostat has become completely satisfied, the blade 58 will break contact with its contact member 67 thereby deenergizing the regulator 115 which will close the inlet damper 110 and open the check damper 111. During the non-heating season, the switch blade 121 may be moved to complete the circuit between the lead wires 145 and 150 which will place the thermostat blade 25 in control of the fan motor 134 irrespective of operation of the bonnet switch 128. If the temperature in the room or space containing the thermostat should now increase to a point at which the blade 25 is set to respond, the blade will make contact with its contact member 33 and complete a circuit through lead wire 145, switch blade 121 and lead wire 150 to the control means of automatic switch 130 and lead wire 150 to the secondary of the relay transformer control means of switch 130, the lead wire 131 completing the circuit from the transformer secondary to the thermostat blade 25. This circuit will actuate the switch 130 to complete the circuit of the fan motor 134 and the fan will continue in operation, supplying cool air from the basement to the room containing the thermostat. If the air to which the blade 25 is subjected is cooled sufficiently by operation of the fan 136 so that the blade 25 leaves its contact member 33, then the circuit of the control means for switch 130 will be broken and the operation of the fan will cease. During the non-heating season, the thermostat blade 58 will be ineffective to have any controlling function. It will be apparent that the range of operation of the blade 25 during the non-heating season may be adjusted by the cam wheel 17 to cause operation of the fan when the temperature has risen to a given degree for which the blade is set to operate by the wheel 17.

Under some conditions it is desirable to provide a system in which the air circulating fan will be operated immediately without requiring opening of the furnace drafts upon a call for heat by the room thermostat provided the temperature of the air in the furnace bonnet is above the minimum desired degree. Such a system may be obtained with the apparatus of Figure 7 by merely reversing the connections of lead wires 118 and 131 to the room thermostat, that is, by connecting the lead wire 118 to the binding post 31 and connecting the lead wire 131 to the binding post 63. With this circuit change, when the room thermostat calls for heat by the blade 58 making contact at 67, a circuit will be completed through the lead wires 119, 127 to bonnet switch 128, and thence via lead wire 129, transformer relay switch 130 and lead wire 131 to binding post 63 and blade 58. If the bonnet switch 128 is satisfied and circuit is closed thereat by the minimum bonnet temperature, then the relay switch 130 will be actuated to start fan 136 to supply heated air to the room or zone to be heated. This supply of heated air may be sufficient to satisfy the blade 58 without requiring opening of the furnace drafts. However, if the room temperature continues to drop irrespective of the heated air supplied by the fan, then the blade 25 will make contact at 34 and a circuit will be completed through lead wires 119, 122, transformer secondary 123, damper heat motor 115, the maximum temperature safety switch 117 and lead wire 118 to binding post 31 and blade 25 thereby energizing the motor 115 to open the furnace drafts. When the switch blade 25 becomes satisfied and breaks circuit at its contact member 34, the damper heat motor 115 will be deenergized thereby closing the furnace drafts while permitting the fan 136 to continue in operation until the switch blade 58 is satisfied at the desired room temperature and opens the circuit at its contact 67 of the fan controlling relay switch 130.

What I claim and desire to secure by Letters Patent of the United States is:

1. A control device, comprising a base member, a support projecting from said member, a contact member fixed to said support, a supporting post on said base member, an adjustment lever pivotally supported at one end on said post, an adjustment member engaging said lever, a spring having one end fixed to said post and having its other end bearing against said lever to urge said lever into engagement with said adjustment member, a bimetal switch blade carried by the other end of said lever and extending longitudinally thereof, a contact member carried by the free end of said blade and cooperable with said fixed contact member, and means for adjusting the position of said blade relative to said lever.

2. A control device, comprising a base member, an adjustment lever pivotally mounted on said member, an adjustment member for moving said lever, a bimetal switch blade carried by said lever, a second adjustment lever pivotally mounted on said base member, said second-named lever being separate from said first-named lever, a bimetal switch blade carried by said second-named lever, and means operatively connecting said levers whereby said second-named lever is movable with said first-named lever.

3. A control device, comprising a base member, an adjustment lever pivotally mounted on said member, an adjustment member for moving said lever, a spring urging said lever into engagement with said adjustment member, a bimetal switch blade supported by said lever, a second adjustment lever pivotally mounted on said base member, a bimetal switch blade supported by said second-named lever, said second-named lever having engagement with said first-named lever, and a spring acting on said second-named lever and holding said levers in engagement whereby said second-named lever is movable with said first-named lever.

4. A control device, comprising a base member, an adjustment lever pivotally mounted on said member, a supporting member projecting from said base member intermediate the ends of said lever, a cam wheel rotatably mounted on said supporting member and engaging said lever, a bimetal switch blade supported by said lever, a second adjustment lever pivotally mounted on said base member, a bimetal switch blade supported by said second-named lever, and means operatively connecting said levers whereby said second-named lever is movable with said first-named lever.

5. A control device, comprising a base member, an adjustment lever pivotally mounted on said member, an adjustment member for moving said lever, a bimetal switch blade fixed to said lever, a second adjustment lever pivotally mounted on said base member, a bimetal switch blade fixed to said second-named lever, a contact member carried by said base member and cooperable with one of said blades, opposed contact members carried by said base member and cooperable with the other of said blades, and means operatively connecting said levers whereby said second-named lever is movable with said first-named lever.

6. A control device, comprising a base member, an adjustment lever fulcrumed on said base member, an adjustment member for moving said lever, a bimetal switch blade carried by said adjustment lever, a contact member on said base member and cooperable with said bimetal blade, a second adjustment lever fulcrumed on said base member, a bimetal switch blade carried by said second-named adjustment lever, a second contact member on said base member for cooperation with said second-named bimetal switch blade, means operatively connecting said levers whereby said second-named lever is movable with said first-named lever to position said blades relative to their cooperative contact members, and means for adjusting one of said blades relative to its lever whereby to obtain a differential between the degrees of temperature at which said blades will make contact with their respective contact members.

7. A control device, comprising a base member, an adjustment lever fulcrumed on said base member, an adjustment member for moving said lever, a bimetal switch blade carried by said adjustment lever, a contact member on said base member and cooperable with said bimetal blade, a second adjustment lever fulcrumed on said base member, a bimetal switch blade carried by said second-named adjustment lever, a second contact member on said base member for cooperation with said second-named bimetal blade, means operatively connecting said levers whereby said second-named lever is movable with said first-named lever to position said blades relative to their cooperative contact members, and individual means for adjusting each of said blades relative to its lever whereby to obtain a differential between the degrees of temperature at which said blades will make contact with their respective contact members.

8. A control device, comprising a base member, an adjustment lever fulcrumed on said base member, a bimetal switch blade carried by said adjustment lever, a contact member on said base member and cooperable with said bimetal blade, a second adjustment lever fulcrumed on said base member, a bimetal switch blade carried by said second-named adjustment lever, a second contact member on said base member for cooperation with said second-named bimetal blade, individual adjusting means carried by said levers for tensioning said bimetal blades whereby to obtain a differential between the degrees of temperature at which said blades will make contact with their respective contact members, and an adjustment member for moving said levers in unison whereby to change the temperature at which said blades will engage their respective contact members without changing the said differential between the degrees of temperature at which said bimetal blades will engage their respective contact members.

9. A control device comprising a base member, a supporting means mounted on said base member, a contact member fixed to said supporting means, an adjustment lever pivotally supported at one end on said base member with its free end and its pivot point being substantially in alignment with said contact member, an adjustment member engaging an outer side of said lever, spring means urging said lever into engagement with said adjustment member, a bimetal switch blade carried by said lever and extending linearly and longitudinally thereof with its free end extending beyond said fixed contact member, said adjustment member engaging said lever between said one lever end and the point of engagement of said blade and said lever, and a contact member carried by the free end of said blade and cooperable with said fixed contact member.

10. A control device comprising a base member, a contact member mounted on said base member, a supporting post on said base member, an adjustment lever fulcrumed at one end on said post, an adjustment member engaging said lever for moving the same, a leaf spring having one end fixed to said post and the other end engaging said lever for maintaining engagement between said lever and said adjustment member, a bimetal switch blade having one end fixed to the free end of said lever and extending linearly and longitudinally thereof, and a contact member carried by the free end of said blade and cooperable with said first-named contact member.

11. A control device comprising a base member, a contact member mounted on said base member, an adjustment lever fulcrumed on said base member with its free end and its fulcrum point substantially in alignment with said contact member, said lever having an offset portion between its ends and having a flange member adjacent said offset portion, an adjustment member disposed at said offset portion at one side of said lever, said adjustment member being supported on said base member at a point substantially in alignment with the fulcrum point of said lever and its free end, a leaf spring mounted on said base member and having one end engaging said flange member to urge said lever against said adjustment member, a bimetal blade having one end fixed to the free end of said lever and extending substantially longitudinally thereof with its free end disposed adjacent said contact member, and a contact member carried by the free end of said bimetal blade and cooperable with said first-named contact member.

12. A control device comprising a base member, a contact member mounted on said base member, an adjustment lever fulcrumed at one end on said base member, an adjustment member including a wheel mounted on said base member at one side of said adjustment lever, said wheel having a helical cam concentric therewith with its helical face directed toward said adjustment lever, said adjustment lever having a flange disposed adjacent said cam, a cam follower member carried by said flange for engagement with the helical face of said cam, spring means for maintaining said cam follower in engagement with said cam so that said adjustment lever is movable by operation of said wheel, a bimetal switch blade having one end fixed to said adjustment lever and having its free end disposed adjacent said contact member, and a contact member carried by the free end of said bimetal switch blade and cooperable with said first-named contact member.

13. A control device comprising a supporting means, a movable adjustment member carried by said supporting means, a second movable adjustment member carried by said supporting means for moving said first-named adjustment member, yieldable means holding said first-named adjustment member and said second-named adjustment member in operative engagement, a thermostatic element carried by said first-named adjustment member, a third movable adjustment member carried by said supporting means, a thermostatic element carried by said third-named adjustment member, and yieldable means holding said first-named and said third-named adjustment members for movement together so that said third-named adjustment member is movable with said first-named adjustment member.

EARNEST J. DILLMAN.